W. D. MARKS.
GEARING.
APPLICATION FILED JULY 10, 1906.

965,846.

Patented July 26, 1910.
2 SHEETS—SHEET 1.

Witnesses
Walter P. Pullinger
Wills A. Burrows

Inventor
William D. Marks.
by his Attorneys,
Howson & Howson

W. D. MARKS.
GEARING.
APPLICATION FILED JULY 10, 1906.
965,846.
Patented July 26, 1910.
2 SHEETS—SHEET 2.
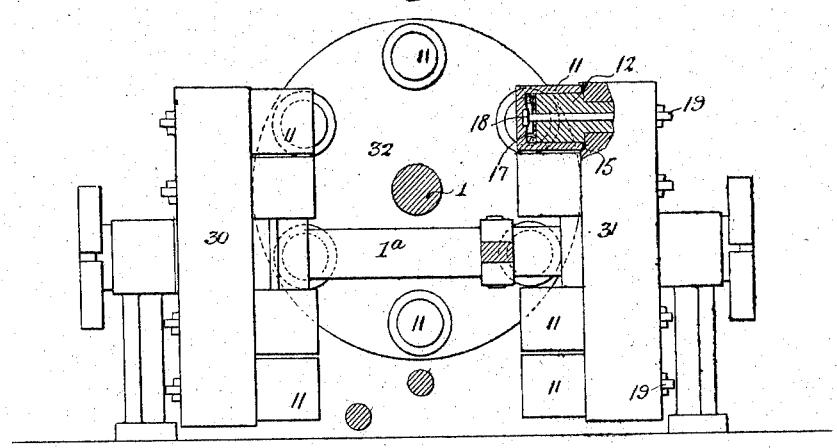
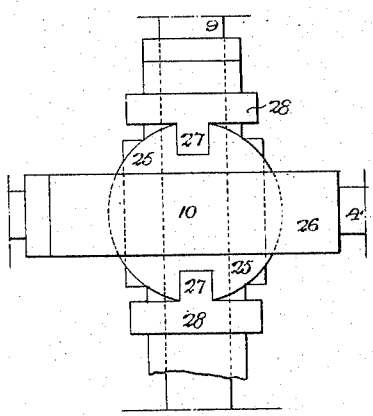
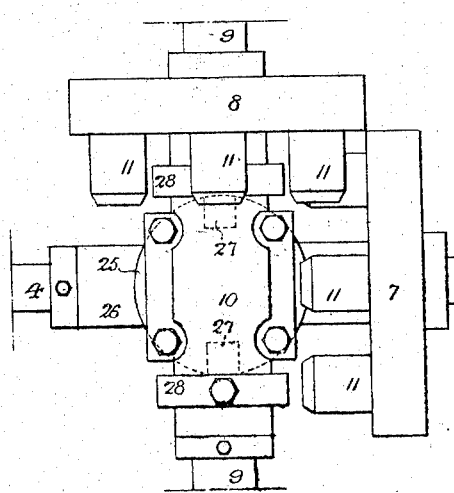
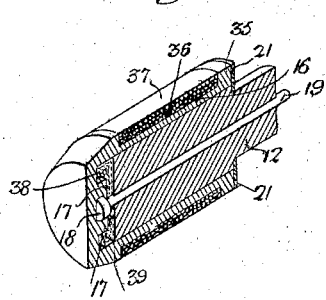
Witnesses:
Inventor
William D. Marks,
by his Attorneys,
Howson & Howson

UNITED STATES PATENT OFFICE.

WILLIAM D. MARKS, OF WESTPORT, NEW YORK.

GEARING.

965,846.

Specification of Letters Patent. Patented July 26, 1910.

Original application filed May 26, 1905, Serial No. 262,505. Divided and this application filed July 10, 1906. Serial No. 325,549.

*To all whom it may concern:*

Be it known that I, WILLIAM D. MARKS, a citizen of the United States, and a resident of Westport, Essex county, New York, have invented certain Improvements in Gearing, being a division of my application for patent, filed May 26, 1905, Serial No. 262,505, of which the following is a specification.

My invention relates to mechanism for transmitting power for the propulsion of wheeled vehicles or for driving any form of machinery, and it consists of certain improvements in driving and transmitting mechanism which may be applied to an improved type of self-propelled car or locomotive forming the subject of a companion application in which an internal combustion engine may be employed as the source of power.

When employed in connection with the operation of a self-propelled car or locomotive, the power transmitting or driving shaft may be connected by means of extension couplings and universal joints to line-shafts carrying wheels or disks having heavy pins which mesh with and serve to drive similar wheels or disks carried by the car axles, the whole forming a flexible and massive linkage.

Figure 1:
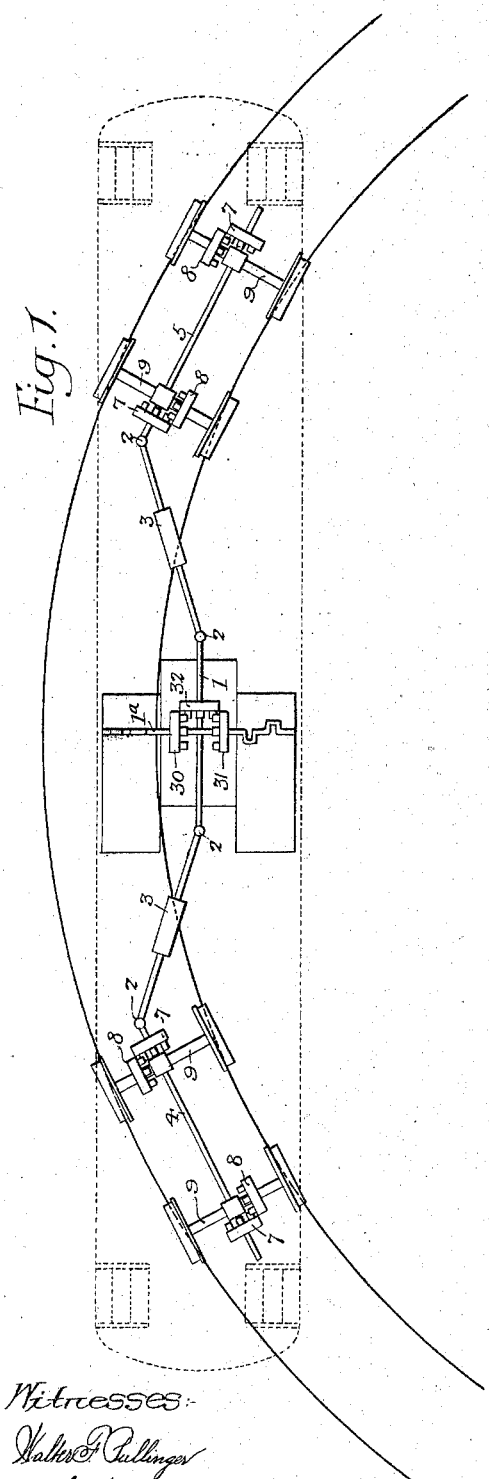
Figure 2:
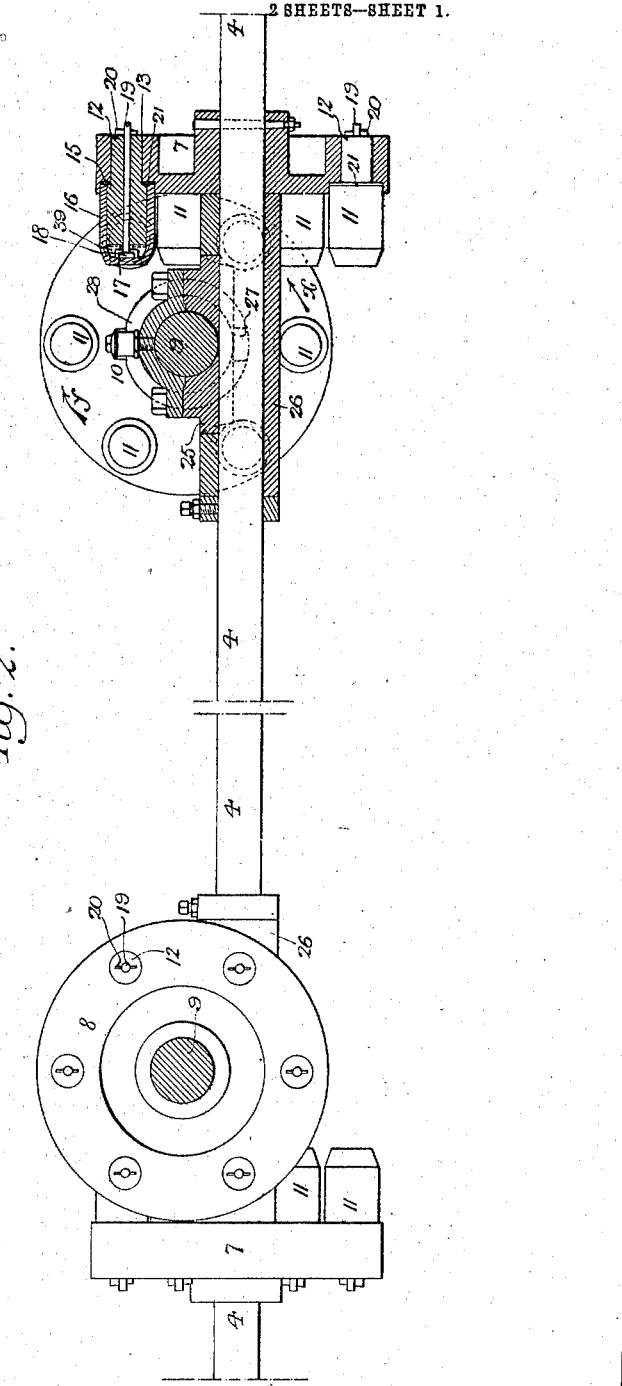

My invention is fully shown in the accompanying drawings, in which:

Figure 1, is a diagrammatic plan view of the driving and transmitting mechanism forming the subject of my invention, as applied to a car, the latter being shown by dotted lines; Fig. 2, is a sectional elevation of the pin gearing for transmitting movement from the linkage shafts to the car axles, showing also the swiveling hanger; Fig. 3, is a plan view of a portion of this pin gearing; Fig. 4, is an enlarged view of my improved pin gearing employed with reversing mechanism; Fig. 5, is an inverted plan view of a part of Fig. 2, and Fig. 6, is a sectional perspective view of one of the pins.

In the present application of my improved driving and transmitting mechanism, it is disposed entirely beneath the car body, being supported by a suitable cradle carried by the car frame, and one of the most important features of this application of my invention is the driving of all the car axles with an equal velocity ratio; the entire weight of the car and its driving mechanism riding upon such axles and being employed for adhesion and tractive effort.

A central longitudinal driven shaft 1, forming the power transmitting member, is connected, by means of universal joints 2 and extension couplings 3, with line-shafts 4 and 5, disposed beneath the trucks, each of which shafts 4 and 5 carry two pin gear disks 7, which in turn mesh with pin gear disks 8 carried by the axles 9 of said trucks. Each of the shafts 4 and 5 are mounted in swiveling journals or bearings 10 supported by the axles 9 of the trucks, and such journals or bearings are so arranged as to permit rocking movement of these joints.

The pin gearing forming the subject of my invention is a decided departure from the ordinary type of gearing employed for transmitting motion in driving vehicles of heavy type. The disks 7 and 8 forming part of this gearing may be quite large, in this case being about eighteen inches in diameter, although they can be much larger for heavier types of cars, and smaller if desired. In the present instance each disk carries six pins 11, set equidistantly and as near as practicable to the margin or rim of such disks. These pins 11 in turn mesh with similar pins carried by the disks 8 mounted on the truck axles 9 to effect the rotation of the latter, and while permitting a limited sidewise movement of said axles, this construction creates no side thrust common with the use of bevel gears.

The pins which I employ are composite in their structure, comprising cores or stems 12, fitting apertures 13 formed in the disks; such cores being centrally bored from end to end. The apertures 13 are enlarged at 15 just below the surface of the disk, and carried by the cores are sleeves 16, which extend into the enlarged portions of the sockets, and, while being free to turn therein, provide an oil-tight cover for such cores so that the inner surface of the same may be lubricated by an internal oil supply. The inner wall at the end of these sleeves is provided with lugs 17 to receive the head 18 of a bolt 19, extending through the central bore of the core, which may be fastened by means of a nut, or a cotter pin 20. A leather washer 21 is interposed between the sleeve 16 and the bottom of the recess 15 receiving the same. These pins and their rotatable sleeves, which may be made of any desirable material, are quite massive; in the present case being nearly four inches in diameter. This dimension is equal, in the present instance, to the distance between the centers of the shafts 4 and 5 and the axles 9 carrying the same, and for the greatest efficiency in this form of gearing the pins should always bear this relation to the shafts. Being of such size, they are practically indestructible and will be unaffected by dirt, grit, wood or stones raised from the roadbed of the track; in most cases throwing such material aside or grinding it between their engaging surfaces; the sleeves being free to turn at the same time and the wear of the same is quite inappreciable.

The linkage shafts 4 and 5 are supported by saddles 25 carried by the axles 9, such saddles having sleeves 26 surrounding said linkage shafts, and forming the bearings 10. The saddles are supported by side lugs 27 of collars 28 carried by the axles 9. The collars 28 are fixed to the saddles 25 and permit the linkage shafts 4 and 5 to compensate for the movements of the axles due to undulations or irregularities in the roadbed, by a limited sidewise movement.

The driving shaft 1ᵃ, Figs. 1 and 4, from which power is transmitted to the truck axles through the mechanism described, carries a pair of disks 30 and 31, having pins 11 which mesh with similar pins mounted in a disk 32 carried by the shaft 1; suitable clutching means being provided to couple either disk 30 or 31 to the shaft 1ᵃ whereby the latter may turn the disk 32 on the shaft 1. The disk 32 is loose on the shaft 1 and power may be transmitted to said shaft through the medium of planet gearing in the well known manner.

It will be noticed that the pins carried by the disks on the linkage shafts 4 and 5, the truck axles 9, and the loose disk 32, are provided with beveled ends, while the pins on the disks 30 and 31 are not beveled. In gearing of this character when the driving and driven shafts are disposed with non-intersecting axes in the manner I have shown and described, the engagement of a pin on the disk 7 of the lower shaft with a pin on the disk 8 of the upper shaft when the lower shaft is the driving element and when turning the disk 8 in the direction of the arrow x, Fig. 2, is directly against the body of the pin. When turned in the opposite direction, however, as indicated by the arrow y, with the lower shaft as the driving element, the surface of the pins of the lower disk engages the marginal end of the other pins and unless such latter pins are beveled to force the passage of the other pins the gearing will jam. It is therefore necessary to bevel both sets of pins carried by the disks 7 and 8, and the disk 32, but it is not necessary to bevel the pins of the disks 30 and 31, as the pins of these latter disks at their point of engagement are below the pins of the disk 32 and therefore never engage the ends of the same, except when turning loosely.

In the structure shown and described herewith, the pitch diameters of the pin disks are equal, in consequence of which the diameter of said pins is equal to the distance between the centers of the coacting shafts carrying the same, and their ends are beveled as described to facilitate their engagement when driven in certain directions. When the pitch diameters of the pin disks are not equal, however, the pins may have epicycloidal and hypocycloidal axial sections, or even other sections to be determined by experiment.

In pin gearing of the character forming the subject of my invention; the pins being of such massive size, means must be provided for reducing the noise ordinarily occasioned by their engagement. The sleeves carried by the pins are arranged to rotate with respect thereto and this will in a measure dissipate the objectionable noise. To remove it entirely, however, I provide the surface of the sleeves with a special composition that is, both non-wearing and non-resonant.

A sleeve prepared in accordance with this part of my invention is fully shown in the perspective view, Fig. 6. The sleeve 16 is provided with shoulders 35 at each end, forming an annular recess 36 between said shoulders, and this recess is filled by winding a strip or strips 37 of raw-hide, saturated with water around the same, the ends being secured by suitable means. The sleeve thus prepared is soaked in pitch at 212° F., the heat of which drives out the moisture and replaces such moisture with pitch. The sleeve is then coated with a composition consisting of equal parts of bitumen and hydraulic cement and before this has set, it may be pressed and trued to the desired shape. Other means of providing a non-resonant surface for the sleeves are possible, such for instance, as filling the space or recess 36 of the same with aluminum-Babbitt metal or other non-resonant anti-friction metal. The inner recess of the sleeve is filled with absorbent material 38 which is retained in place by a section of wire gauze 39, and this absorbent material is saturated and the space filled with oil to lubricate the surface of the pins and the sleeves turning thereon.

I claim:

1. In geared driving mechanism, the combination of a driving shaft, a driven shaft disposed at right angles to and crossing the driving shaft, a disk carried by the driving shaft, a disk carried by the driven shaft, pins projecting from the faces of said disks for engagement with each other whereby one shaft may be driven by the other, the diameter of said pins being equal to the distance between the centers of the shafts, said pins having beveled ends to facilitate their engagement when driven, rotatable sleeves carried by said pins, and a covering of non-resonant material for said sleeves.

2. In geared driving mechanism, the combination of a driving shaft, a driven shaft disposed at right angles to and crossing said driving shaft, said shafts bearing a fixed relation to each other, disks on said shafts, pins carried by said disks for mutual engagement whereby one shaft may be driven by the other, rotatable sleeves carried by said pins, means for holding said pins in place, and means internally disposed for lubricating said sleeves.

3. In driving mechanism, a disk having a series of openings, a series of pins having shanks fitting said openings, the latter having shouldered recesses at one end, and rotatable sleeves carried by said pins and fitting said recesses.

4. In driving mechanism, a disk having a series of openings, a series of pins having shanks fitting said openings, the latter having shouldered recesses at one end, rotatable sleeves carried by said pins and fitting said recesses, and washers interposed between said sleeves and the shoulders of the recesses.

5. In driving mechanism, a disk having a series of openings, a series of pins having shanks fitting said openings, the latter having shouldered recesses at one end, rotatable sleeves carried by said pins and fitting said recesses, and means for confining said sleeves to the pins but permitting them to turn with relation thereto.

6. In driving mechanism, a disk having an opening, a pin having a shank fitting said opening, there being a shouldered recess formed at one end of said opening, and a rotatable sleeve carried by said pin and adapted to fit said recess and hermetically seal the oiled contact surfaces of the pin and sleeve.

7. In pin gear driving mechanism, the combination of the disk, a series of pins carried thereby, sleeves carried by said pins, and a covering of noise deadening material carried by said sleeves.

8. In pin gear driving mechanism, a pin, a sleeve therefor, and a covering of fibrous material serving as a noise deadener.

9. In pin gear driving mechanism, a pin, a sleeve carried thereby and having end flanges, a layer of rawhide wrapped around said sleeve, a coating of pitch for said rawhide, and a plastic covering consisting of equal parts of bitumen and hydraulic cement.

In testimony whereof, I have signed my name to this specification, in the presence of two subscribing witnesses.

WM. D. MARKS.

Witnesses:
C. V. LACOMBE,
WM. G. QUIRK.